June 14, 1938. J. T. LYNCH 2,120,706
FILM DEVELOPING RACK
Filed Oct. 11, 1937
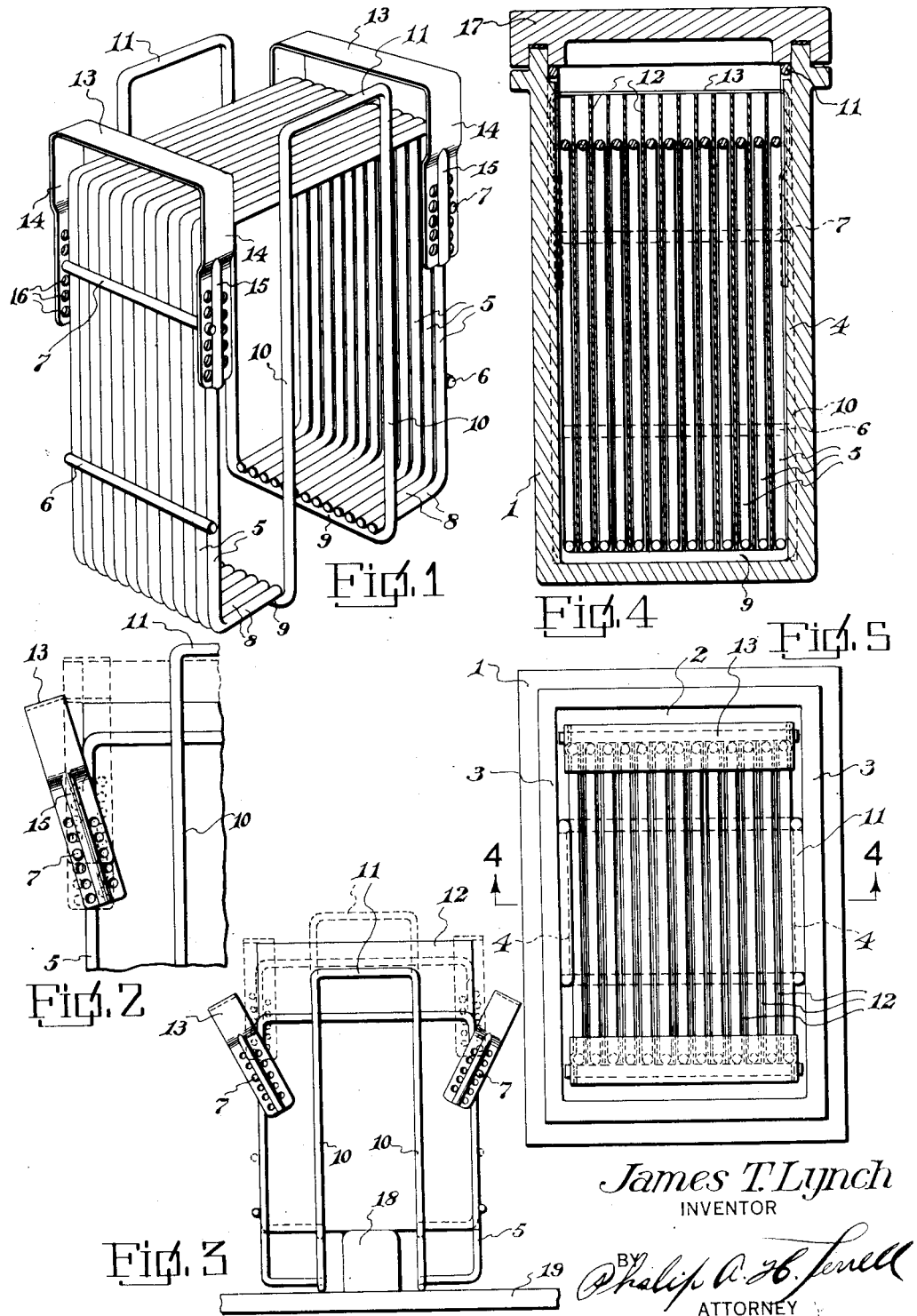
James T. Lynch
INVENTOR
ATTORNEY Patented June 14, 1938

2,120,706

UNITED STATES PATENT OFFICE 2,120,706

FILM DEVELOPING RACK

James T. Lynch, Tulsa, Okla.

Application October 11, 1937, Serial No. 168,447

10 Claims. (Cl. 95—100)

The invention relates to film developing racks, and has for its object to provide a device of this character in which a plurality of films may be placed and supported in spaced relation and the rack then submerged in a developing fluid.

A further object is to provide means whereby, after the developing operation, the rack may be placed over a film support engaging the lower ends thereof in a manner whereby the films will be forced upwardly from the rack as the rack is lowered onto the support.

A further object is to provide a developing tank in which the rack is received and centered in spaced relation from the walls thereof, thereby allowing the tank to be oscillated or moved for circulating the fluid between the film in the rack for the developing operation.

A further object is to provide hinged U-shaped film holding members adapted to overlie the upper edges of films in the rack and hold them in place during the agitating operation.

A further object is to provide adjusting means for the hinged film holding members whereby films of different height may be held.

A further object is to form the rack from a plurality of inverted U-shaped members in spaced parallel relation and having inturned arms at their lower ends, which are cross connected by upwardly extending spaced U-shaped members, terminating in transverse portions, thereby forming an open bottom rack, which when placed over a member on a table will allow the member to hold the films in raised position as the rack is lowered for a film removing operation.

A further object is to provide the opposite inner walls with inwardly extending enlargements cooperating with the rack for centering the rack and the rack receptacle large enough whereby racks of different size may be received therein.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the rack.

Figure 2 is an enlarged side elevation of one of the upper corners of the rack showing the adjusting and hinging means for the film holding members.

Figure 3 is a side elevation of the rack showing the same on a support for forcing the films upwardly from the rack as the rack is lowered onto the support.

Figure 4 is a vertical transverse sectional view through the rack showing the same in a developing receptacle.

Figure 5 is a top plan view of the rack within the receptacle.

Referring to the drawing, the numeral 1 designates the developing receptacle, which receptacle is provided within the chamber 2 thereof and on the opposite walls 3 with inwardly extending panels 4, the purpose of which will presently appear, however they are adapted to center the film holding rack within the chamber of the receptacle and against movement as the rack is moved from side to side for a liquid agitating operation for developing the films.

The developing rack is formed from a plurality of spaced and rigidly mounted inverted U-shaped members 5, the arms of which are connected together by transversely disposed rods 6 and 7 to form a rigid structure. The lower ends of the arms 5 terminate in inwardly extending spaced arms 8, which are connected together by the transverse portions 9 of the U-shaped members 10, the upper arms of which are connected together by transverse portions 11. It will be noted that when the rack is placed within the developing receptacle, the panels 4 are received between the U-shaped members 10 and the rack is rigidly held against lateral displacement during the oscillation of the receptacle. It will be noted that all the rods forming the parts are round, hence there is a minimum amount of engagement of the rods with the films 12, as clearly shown in Figure 4, however the rods are sufficiently spaced apart to allow the fluid to circulate between the rods and the films. The various rods forming the parts may be welded together to form a rigid structure.

Hingedly mounted on the transverse rods 7 are U-shaped film holding members 13, which are adapted to be hinged upwardly to a vertical position as shown in Figure 1, and in dotted lines in Figure 3 to overlie the upper edges of the films and hold them against displacement during the agitating operation. The U-shaped members 13 are preferably U-shaped and have their arms 14 downwardly disposed at opposite sides of the group of U-shaped members 5 and have spring contact therewith. Arms 14 are provided with struck-out channels 15 in which the outer arms of the outer U-shaped members 5 are received and the spring action maintains the U-shaped members 13 normally in vertical position, however they may be moved to the full line positions shown in Figures 2 and 3 for a film removing operation. It will be noted that the arms 14 of the U-shaped members are provided with a plurality of apertures 16, each series in staggered relation to the other, and by springing the arms 14 outwardly, the ends of the rods 7 may be received in any of the apertures, thereby allowing the U-shaped members 13 to be adjusted for overlying film of different height. By providing two series of apertures in each arm 14, it will be seen that the U-shaped members are interchangeable and also reversible in their positions.

In operation, films to be developed are placed in the rack between the U-shaped members 5, after the members 13 have been hinged outwardly to the position shown in Figure 2. After the films are in position, members 13 are hinged inwardly to arch the upper edges of the films, and the rack as a whole is then placed in the receptacle 1. In placing the rack within the receptacle 1, the panels 4 are received between the arms 10 of the U-shaped members which extend transversely of the rack and cooperate with the arms for laterally holding the rack in spaced relation within the receptacle. It will be noted that the transverse portions 11 of the U-shaped members overlie the upper edges of the panels 4. Transverse portions 11 cooperate with the upper edges of the panels 4 and maintain the spacing of the rack. After the rack and films are placed in the receptacle as above set forth, the receptacle cover 17 is placed in position and then the operator agitates the developing liquid, which has been previously put in the receptacle, by oscillating the receptacle. After the developing operation the cover 17 is removed, the operator grasps the portions 11 and lifts the rack from the receptacle and places the same over an upwardly extending member 18 carried by supporting table 19 with the member 18 between the U-shaped members 10. The U-shaped members 13 having been previously hinged outwardly from the dotted line position to the full line position shown in Figure 3, the rack is lowered onto the table 19, and the member 18 will hold the film 12 against downward movement, hence they will be projected upwardly from the rack where they will be easily gripped by the fingers of the operator for removing the same from the rack. The above operation continues with each batch of film to be developed. It will be noted that wider racks can be placed within the receptacle and rigidly held against lateral displacement on the same panels 4, thereby allowing the same receptacle to receive racks of different size.

From the above it will be seen that a film developing rack is provided which is simple in construction, and one wherein, during an agitating operation, the developing fluid may flow between the films without interruption.

The invention having been set forth what is claimed as new and useful is:

1. A film developing rack adapted to be received within a receptacle having projections therein, said rack comprising a plurality of spaced inverted U-shaped members adapted to receive therebetween films, and spaced arms carried on opposite sides of the rack and adapted to receive therebetween the projections within the receptacle.

2. A film developing rack adapted to be received within a receptacle having projections therein, said rack comprising a plurality of spaced inverted U-shaped members adapted to receive therebetween films, the arms of said inverted U-shaped members forming a transverse opening through the lower side of the rack whereby a film ejecting member may be received therein.

3. A film developing rack adapted to be received within a receptacle having projections therein, said rack comprising a plurality of spaced inverted U-shaped members adapted to receive therebetween films, the arms of said inverted U-shaped members forming a transverse opening through the lower side of the rack, whereby a film ejecting member may be received therein, and spaced guide members carried by the opposite sides of the rack and adapted to cooperate with the receptacle projections for preventing lateral displacement of the rack within the receptacle during an agitating operation.

4. A device as set forth in claim 3 including hinged film holding members carried by opposite sides of the rack and adapted to overlie the upper edges of film within the rack.

5. A device as set forth in claim 3 including hinged film holding members carried by opposite sides of the rack and adapted to overlie the upper edges of film within the rack, and means for adjusting the length of the film holding members, whereby film of different size may be received in the rack.

6. A device as set forth in claim 3 including hinged U-shaped film holding members formed from spring material, the arms of said U-shaped members hingedly and adjustably connected to the inverted U-shaped members and means carried by the film holder arms and cooperating with the inverted U-shaped members for holding the film holding members in overlying relation to the film.

7. A film developing rack adapted to be received within a receptacle, said rack comprising a plurality of spaced inverted U-shaped members adapted to receive film therebetween, the lower ends of the arms of the U-shaped members extending inwardly and terminating in spaced relation thereby forming a transverse passage through the rack for the reception of a film raising member, the ends of the inwardly extending arms being connected together by the transverse portions of spaced U-shaped members, the upwardly extending arms of the last mentioned U-shaped members being cross connected on their respective sides thereby forming rigid guide means for receiving holding members within a receptacle during an agitating operation.

8. A device as set forth in claim 7 including spring U-shaped members hingedly connected to the rack and adapted to overlie the upper ends of film within the rack.

9. A device as set forth in claim 7 including spring U-shaped members carried by inverted U-shaped members and adapted to overlie film within the rack, said spring U-shaped members being adjustably mounted whereby they may be varied in length for overlying film of different height.

10. A device as set forth in claim 7 including U-shaped film holding members formed from spring material and arching the inverted U-shaped members, the arms of said U-shaped film holding members being channeled for receiving the arms of the outer inverted U-shaped members and means for varying the length of the spring film holding members.

JAMES T. LYNCH.